Oct. 21, 1947.     W. H. GREEN     2,429,315
SOLIDS SEPARATOR
Filed March 1, 1941     5 Sheets-Sheet 1
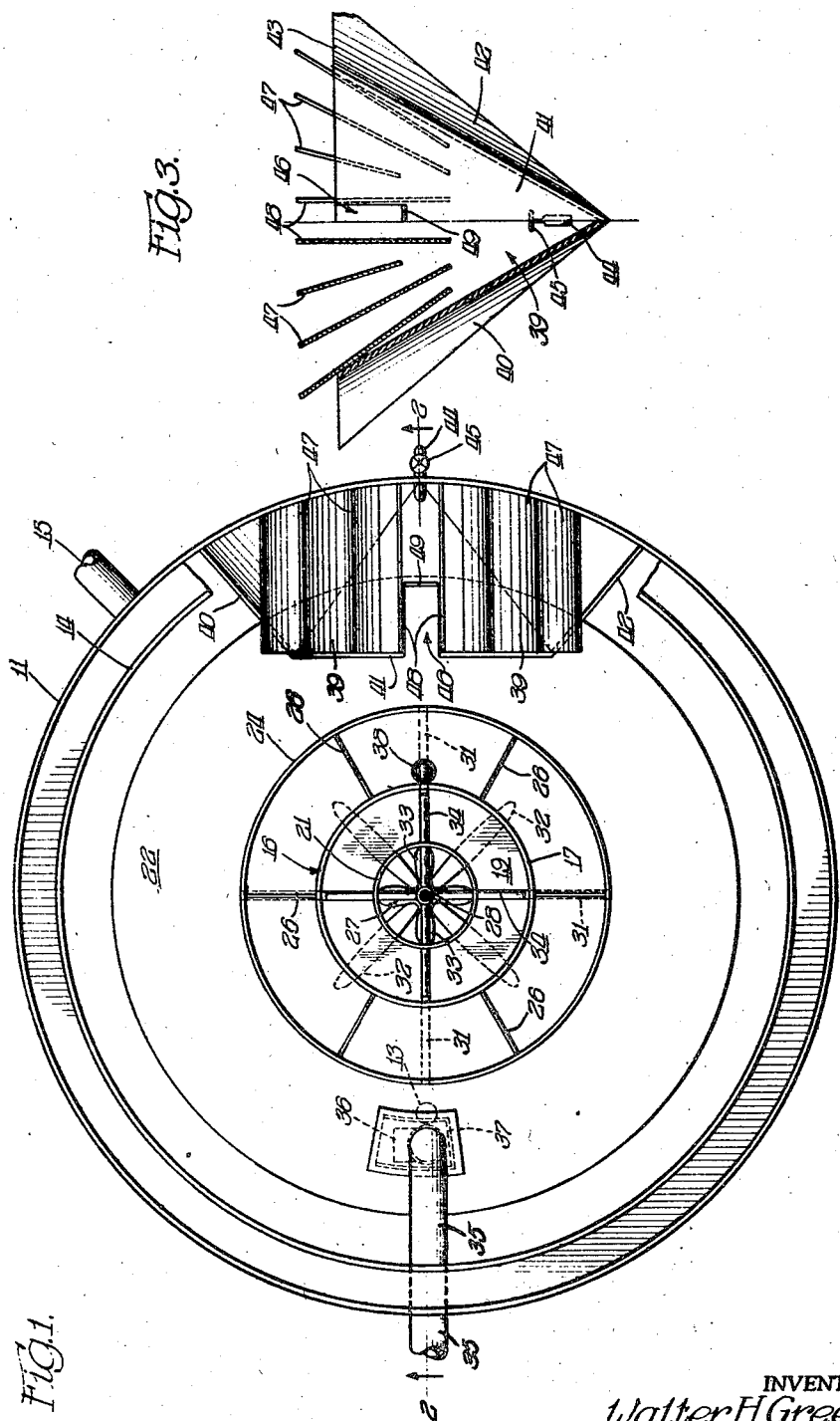
INVENTOR.
Walter H. Green
BY
Atty.

Oct. 21, 1947. W. H. GREEN 2,429,315
SOLIDS SEPARATOR
Filed March 1, 1941 5 Sheets-Sheet 2
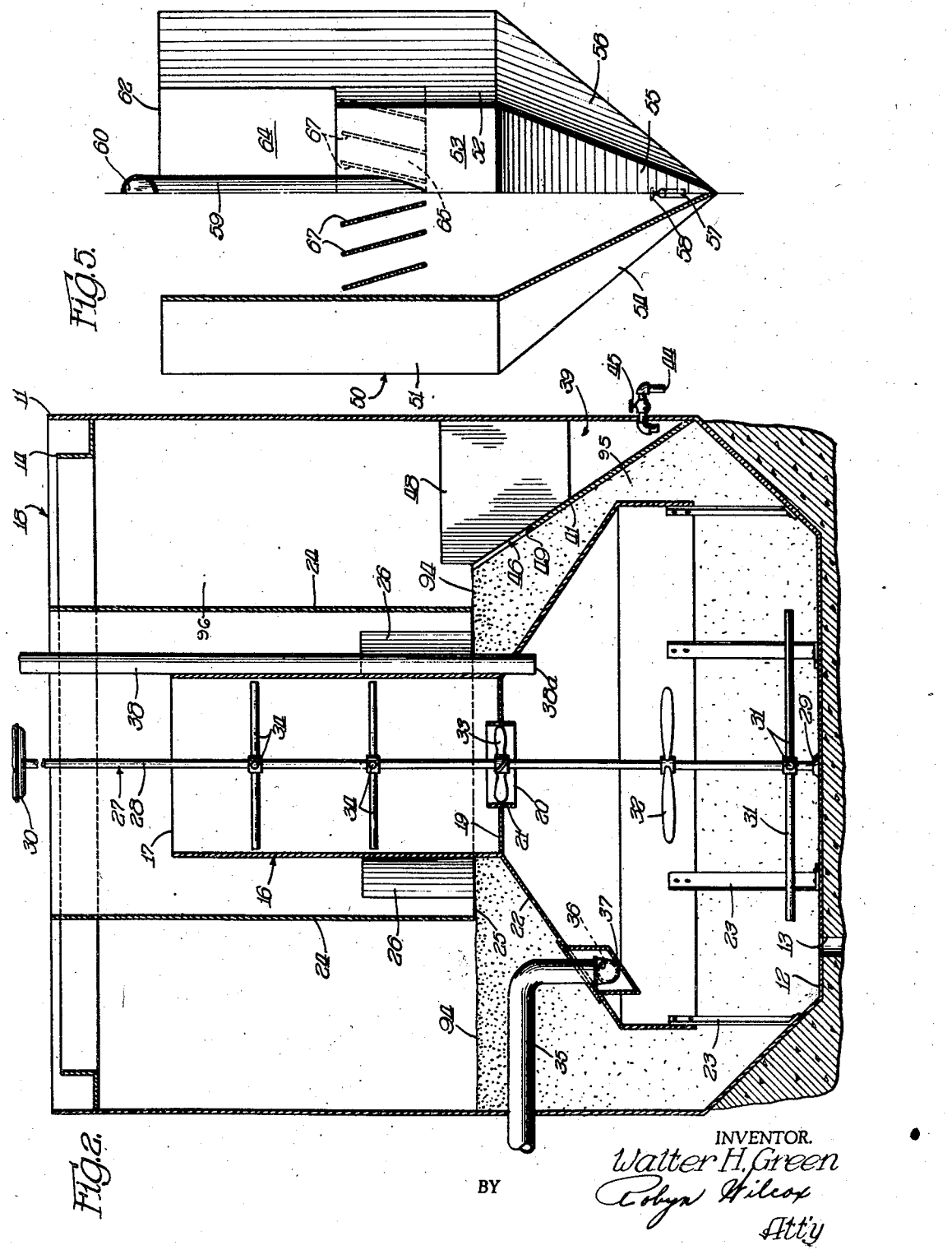

Oct. 21, 1947.  W. H. GREEN  2,429,315
SOLIDS SEPARATOR
Filed March 1, 1941   5 Sheets-Sheet 3
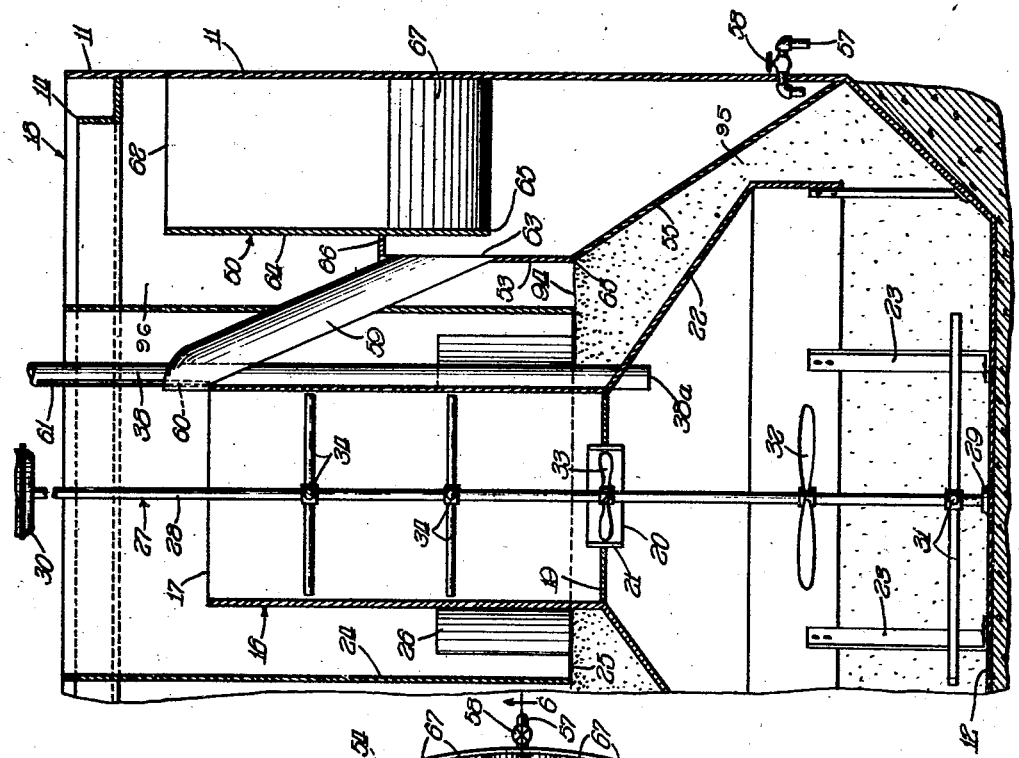
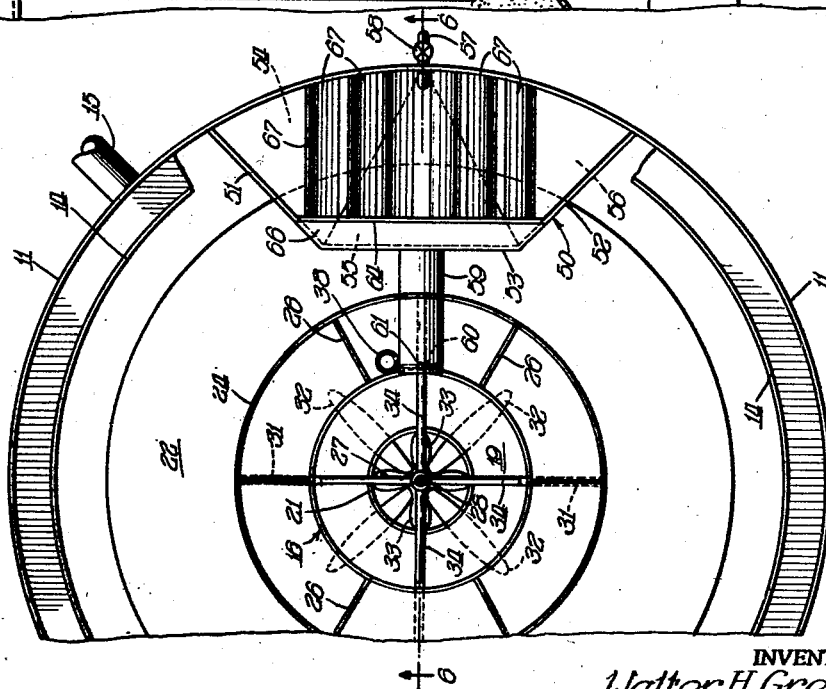
INVENTOR.
Walter H. Green
BY
Atty.

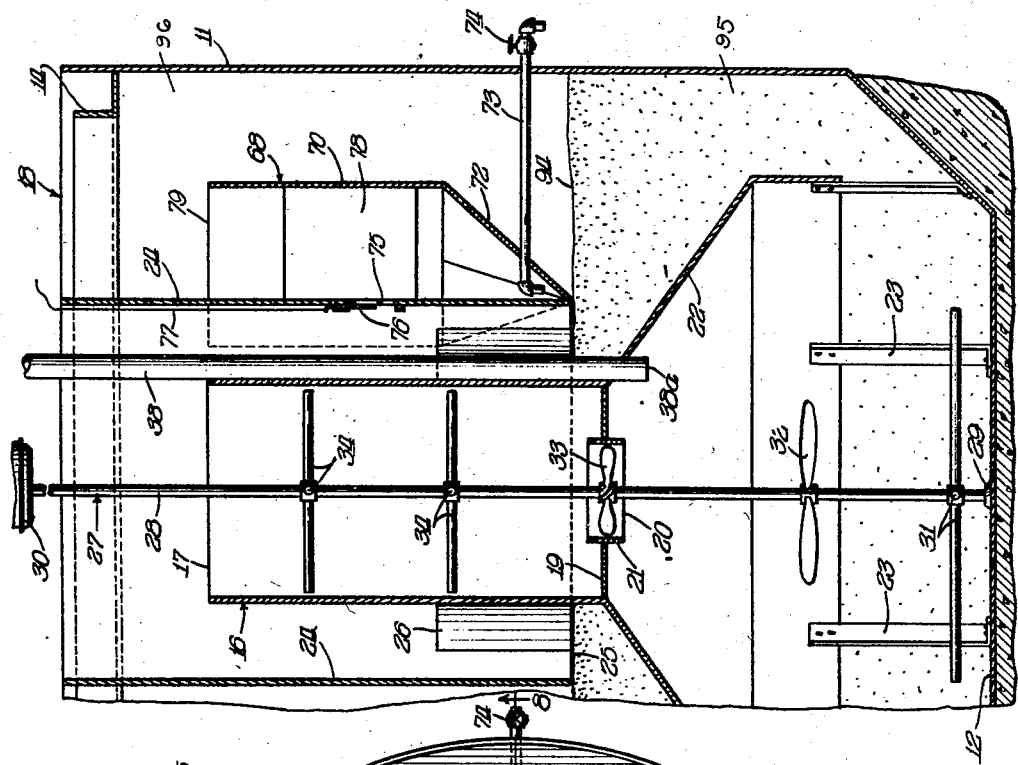

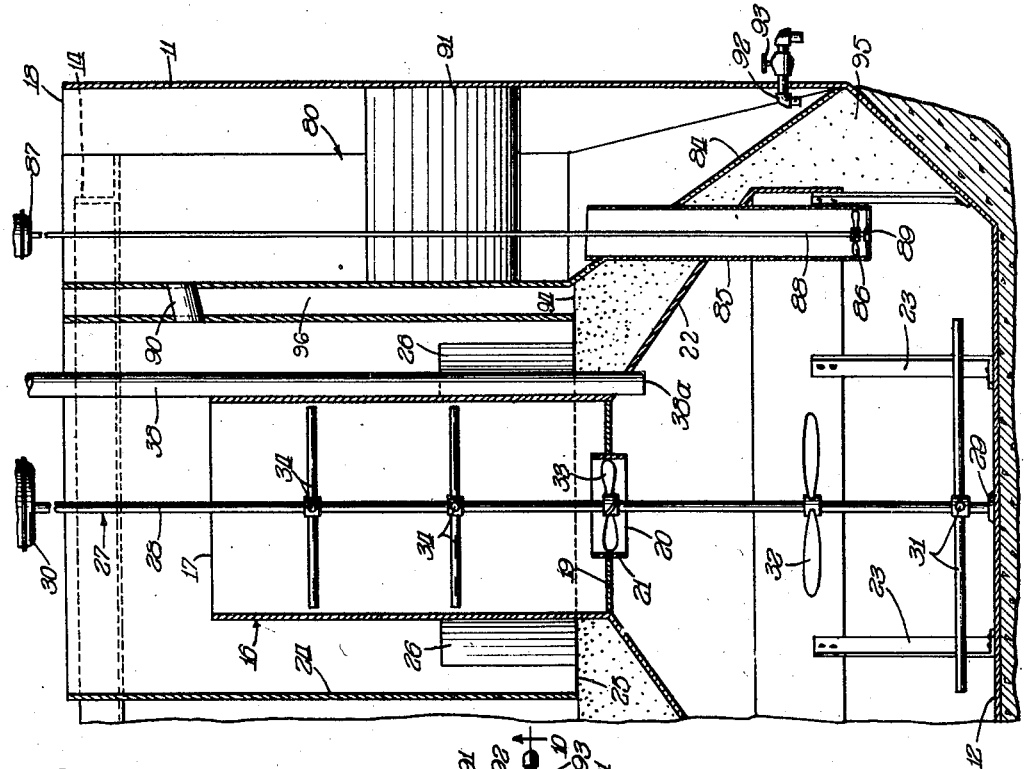

Patented Oct. 21, 1947

2,429,315

UNITED STATES PATENT OFFICE 2,429,315

SOLIDS SEPARATOR

Walter H. Green, Chicago, Ill., assignor to Infilco Incorporated, a corporation of Delaware Application March 1, 1941, Serial No. 381,364

12 Claims. (Cl. 210—16)

1

The present invention relates to the treatment of liquid and has particular reference to an improved method and apparatus for the separation and ultimate removal of solids in suspension in the liquid.

An object of the invention is the separation of liquid and solids precipitated in the treatment of liquid, such as the solids precipitated in the softening of raw water.

Another object of this invention is to provide a method of regulating the solids content of a slurry utilized in liquid treatment.

Another object of the invention is to provide an improved means for maintaining, in a water treatment embodying the use of slurry, the interface between slurry and clarified water at any desired level.

A still further object is to provide an improved means for removing excess solids formed in a liquid treatment.

An additional object of this invention is to provide a means for the separation and subsequent removal of solids contained in a slurry.

Another object of the invention is to provide an improved method of maintaining a predetermined concentration of solids in a slurry, such as that formed in the softening or purification of raw water.

A still further object of the invention is to provide an improved method of and an apparatus for the stabilization of a slurry secured in a liquid treatment in which certain materials in the liquid are removed by precipitation.

An additional object of the invention is to provide an improved process and apparatus for separating substances in a solid form and liquids in a process involving maintenance of a concentrated slurry of suspended particles precipitated from previously treated liquid and held in suspension by agitation and a pattern of circulation in which slurry is mixed with liquid undergoing treatment in a zone of agitation and then divergently distributed in the slurry zone, a portion of the divergent discharge from the mixing zone being displaced upwardly for clarification purposes.

A still further object of the invention is to provide an improved type of a solids separator for use in the treatment of liquids as disclosed in the patents of Walter J. Hughes entitled Liquid treating apparatus, issued June 17, 1941, No. 2,245,588 and No. 2,245,587.

Other objects of the invention will be apparent from the description and claims which follow.

The invention of Walter J. Hughes above men-

2 tioned provides a method of treating liquid by maintaining the particles formed in the treatment against sedimentation and continuously recirculating such particles to the mixing and reaction zone in which the raw liquid is being dosed with chemicals. As therein disclosed, there is an optimum concentration of solids in the slurry used in the treatment process so that it is desirable to provide a means for removing from the slurry the excess of the solid particles over the optimum conditions, and subsequently removing the solid particles from the treatment system. In the operation of liquid treatment works, such as water softening plants, operating under the Hughes invention, it has been discovered that the removal of the excess solids presents a very complex and sometimes a very troublesome question. The present invention relates to a method of and an apparatus for removing the excess solids from the slurry. In such processes the removal of excess solids is very important as exceedingly large amounts of water are treated in a relatively small tank. It has been found that in some liquids, such as raw water, the precipitable solids are of such character that the concentration and removal of such solids is difficult as the particles formed are light and tend to remain in suspension rather than become entrapped in the usual separating devices. In other instances the solids tend to form such large and heavy particles that they may drop to the floor and tend to stay there unless an undesirable degree of agitation is employed. Sometimes particles of both kinds will be present in the same slurry and may tend to segregate with the result that a separation and concentration in the apparatus heretofore used may take an undue proportion of one or the other so that the slurry tends to become of an unbalanced nature. It is one of the purposes of my invention to provide apparatus and a method of operation such that undue accumulation or removal of any particular type of particles may be prevented and that all types may be entrapped and removed in proper proportion. To further such control of the type of particles removed and also the nature of the slurry, I propose in one aspect of my invention to withdraw a portion of the slurry from some selected point, as for instance a point where there is no segregation, and to separate and concentrate the solids from such portion. I also have in mind that by controlling the rate or amount of such withdrawal I may control the rate or amount of solids separation to correspond with a variable rate of solids introduction or formation, and so maintain a desirable concentration of slurry density or volume.

In the past, several types of separators have been devised for the collection and separation of the excess solids in the slurry so that such excess could be efficiently removed from the system. One such separator is shown in my prior application for patent entitled Liquid treating apparatus and process, filed June 13, 1938, Serial Number 213,415, now Patent 2,368,354 granted Jan. 30, 1945. My present invention discloses an improved method and improved devices for the separation of such excess solids from the slurry and consequent regulation of the character and density of the slurry. Preferred embodiments of the present invention are shown in the accompanying drawings which form a part of this specification and in which like reference characters in the several figures designate similar elements.

Figure 1 is a plan view of a water treatment device with which the present invention is associated, and disclosing one embodiment of the present invention.

Figure 2 is a vertical cross sectional view of Figure 1 taken along the diameter 2—2 of Figure 1.

Figure 3 is a front view, partly in cross section, of the separator shown in Figures 1 and 2.

Figure 4 is a partial plan view of another embodiment of my invention.

Figure 5 is a front view, partly in cross section, of the separator shown in Figure 4.

Figure 6 is a partial vertical cross sectional view of the embodiment shown in Figure 4, taken along the diameter 6—6.

Figure 7 is a partial plan view of still another embodiment of my invention.

Figure 8 is a vertical cross sectional view taken along the diameter 8—8 of Figure 7.

Figure 9 is a partial plan view of a still further embodiment of my invention.

Figure 10 is a vertical cross sectional view taken along the diameter 10—10 of Figure 9.

The devices of the present invention are improvements over the separator of my previous patent heretofore mentioned and are adapted to assist in the process of water treatment disclosed in the above mentioned invention of Hughes. The Hughes process is carried out in a tank 11, usually circular in shape, provided with a bottom 12. The lower portion of the tank wall may be sloped inwardly, as shown, to facilitate flow toward the center of the tank. Preferably the bottom 12 will be provided with a drain 13 equipped with a suitable valve, not shown, in order to permit the tank to be completely drained in the event the apparatus is shut down. The upper rim of the tank 11 is provided with an annular launder 14 connected to effluent conduit 15.

Extending upwardly through the center of the tank is a cylindrical treating or mixing chamber defined by the cylindrical wall 16, preferably terminating at the upper rim 17 in a plane below the top 18 of the tank 11 and provided with a bottom 19 spaced some distance above the floor 12 of the tank. The bottom 19 of the cylinder may be provided with a concentric circular opening 20 defined by the short cylindrical wall 21. A truncated conical hood 22 is firmly affixed to the bottom 19 of the mixing chamber 16 and is supported above the floor 12 of the tank by any suitable means such as legs 23.

The mixing chamber 16 is surrounded by an outer tube or open ended cylinder 24 concentric therewith, the lower end of which terminates as at 25 above the hood 22 and the upper end extends upwardly above the walls of the mixing chamber 16, such as to a height approximately the height of the walls of tank 11. I prefer to place a plurality of vertical baffles 26 between the walls of the mixing chamber 16 and the walls of the outer tube 24 in order to prevent a turbulent or circular movement of the liquid as it flows downwardly through the outer cylinder 24 after leaving the mixing chamber.

A mixer 27 is coaxially placed within the mixing chamber 16 and comprises a vertical shaft 28 the lower end of which is journaled in bearing 29 in the bottom 12 of the tank. The upper end of the shaft 28 is connected to any source of power such as electric motor 30 provided with suitable reducing gears, not shown. Rigidly secured to the shaft 28 and adjacent to the bottom of the tank may be an agitating arm 31. I prefer to affix to the shaft 28 two impellers such as 32 and 33. One of these impellers, such as 32, should be of such size and so placed within the hood 22 as to impart considerable turbulence to the water therein. The other impeller, 33, should be of such size and so placed as to impart an upward turbulent movement to a portion of water from the hood 22 through treating chamber 16. The second impeller 33 may either lie within the vertical walls 21 defining the opening 20 of the bottom of the mixing chamber, as shown, or may be located within the upper portion of the treating chamber. I may also rigidly affix a series of blades or bars 34 to the portion of the shaft 28 within the treating chamber 16, in order to secure a very thorough mixing of the water passing therethrough. It is evident that upon the rotation of the agitator 27 the agitation arm 31 will cause liquid adjacent the floor to become sufficiently agitated to prevent sedimentation of most solids contained therein; that the impeller 32 will cause considerable turbulence of liquid under the hood 22; that impeller 33 will cause an upward flow of water through the mixing chamber 16; and that the additional bars 34 within the treating chamber will cause a thorough mixing of the liquid passing therethrough.

Water is taken into the system through conduit 35, which discharges into the hood 22 as at 36. Preferably I discharge raw water onto shelf 37, open to the passage of water therefrom in the direction of rotation of the impellers, and discharging the raw water into the hood in the form of a sheet. Chemicals which may be necessary in order to precipitate the solids from the water may be added by chemical feed line 38 preferably extending into the hood 22 as at 38a. Clarified water is withdrawn from the tank 11 through launder 14 and effluent pipe 15.

As described in the invention of Hughes above mentioned raw water is discharged into the hood 22, through which is flowing a steady and turbulent stream of slurry precipitated from prior treatment of the water, the volume of the slurry ordinarily being considerably greater than that of the water to be treated. The slurry and raw water, with the necessary dosing chemicals, are thoroughly mixed and agitated within the hood 22 and are further mixed and agitated by flowing upwardly into mixing or treating chamber 16 and passing therethrough. After passing over the upper edge 17 of the mixing chamber 16 the admixture flows into the outer cylinder 24, downwardly therethrough, and out at the open lower end 25. A large quantity of this mixture passes over and around the hood and is drawn upwardly therein by the impeller 32 which agitates the slurry therein and thoroughly mixes the slurry with chemicals from line 38 and with fresh raw water, from line 35, and again circulates through treating chamber 16 and outer cylinder 24. A portion of the treated water equivalent to the volume of the incoming water to be treated will rise upwardly from the circulating slurry 95 in the tank and into the clarified water space or chamber 96 in the upper portion of the tank and thence out of the tank 11 through launder 14. As described in the said Hughes patent, there is a sharp surface or interface as at 94 dividing the slurry in the bottom of the tank and the clarified effluent at the top. It is evident that the location of this interface 94 can be maintained at any desired position level with or above the lower end 25 of outer cylinder 24 by controlling the removal of the excess solids from the slurry. Under most conditions I prefer to maintain the interface or slurry surface 94 at or only slightly above the level of the lower end 25 of the outer cylinder 24.

It is self-evident that if the solids separated from the liquid to be treated by the above process are not removed from the tank 11 the slurry interface will gradually rise in the tank until it reaches the overflow 14. As the amount of water treated by this method is large relative to the size of the tank, great amounts of slurry are formed, and solids will gradually disperse into the upper portion of the tank unless carefully controlled. It is therefore desirable to rather carefully control the location of the slurry interface 94 and to collect and remove excess solids after a predetermined location of the slurry interface 94 has been reached. Generally the amount of solids which should be removed is the equivalent of the solids which will be added to the system by the treatment of raw water after the predetermined slurry level has been secured.

The above apparatus and method is not claimed in the present application. The description is given merely to show a form of the equipment and process with which the present invention is associated. The present invention is concerned with means for maintaining the slurry surface at some desired level even with or above the lower end 25 of the cylinder 24, and to continuously collect the excess solids formed by the continued treatment of raw water.

In Figures 1, 2 and 3, I show one embodiment of my invention. A separating, or solids collecting, or solids regulating chamber 39 is defined by the outer wall of tank 11 and a partition structure formed by walls 40, 41 and 42, sloped to form a small pocket. The separator is located within the tank and at a height on the wall of tank 11 such that the top 43 of the separator 39 is approximately at or slightly below the desired slurry interface 94. As shown in Figure 3 I prefer that the top 43 of the separator, which is open, be substantially horizontal. A sludge withdrawal conduit or pipe 44 leads from the low portion of the pocket formed by the sloping walls of the separator, outwardly through the tank wall for removal and discharge of concentrated excess solids. The line 44 is equipped with a valve 45 in order to permit regulation of the amount of material withdrawn. The withdrawal of material to be taken from the system may be continuous in large installations, but in small ones I prefer to use automatic timed valves, which at predetermined times are opened for a predetermined period. Such valves are well known and need not be described. In either event, the valve 45 should be adjustable so that an amount of solids equivalent to new solids added to the system by the treatment of water may be removed from the separator with as small an amount of water as possible.

As shown in these figures, I prefer to have an opening, which may be of any shape, such as vertical slot 46, in the inner wall 41 of the separator. The opening 46 should extend downwardly to a point somewhat below the lower end 25 of outer cylinder 24 and in some installations may extend down to the level of the bottom of the slope of the hood. An important feature of the Hughes invention is the aggregation of the minute particles of precipitated solids into aggregates of relatively large size. The aggregates grow rapidly within the mixing chamber, so that often when discharged from the outer cylinder 24 they are too heavy to rise above the level of the discharge outlet at the lower end of the cylinder, 24. In the past many of these larger aggregates were too heavy to rise to the upper rim of the collector and would therefore pass down the outer surface of the hood 22 and would ultimately become too large to remain in suspension. I have found that by placing the slot 46 in the front wall of the separator 39 many of the heavier particles will find their way through it and thereby collect therein. It might seem that the amount of heavy particles passing through such an opening would be too inconsequential to be of any practical benefit. However, actual use has shown that most of the heavy particles find their way into the regulating chamber 39 through this opening, and that if this opening is closed such particles do not get into the separator at all.

I may place a plurality of sloping baffles 47 within the separator 39, as further shown in Figures 1, 2 and 3. I find that best results are secured if the baffles are inclined at a relatively steep angle so that solids collected thereon will slide down and into the separator. I therefore prefer that the baffles have an angle of approximately 45 degrees or more from horizontal. I also find that optimum results are secured if the baffles extend for a substantial distance into the chamber 39. The baffles may extend above the upper edge, 43, of the chamber, as shown. These baffles serve a threefold purpose: they collect light slurry particles which otherwise would not become entrapped in the collector pocket; they de-water the particles collected, which tend to slide down the baffles, so that a maximum amount of solids may be withdrawn through line 44 with a minimum amount of water; and in the event the solids are not withdrawn at a sufficiently rapid rate they increase the depositing area as the slurry interface rises, thereby acting automatically to oppose a rise of the slurry interface above the optimum position. The number and size of the baffles 47 will depend primarily upon the quality and condition of the liquid to be treated. If the solids formed by the treatment are light and do not aggregate readily, more baffle area is necessary in order to collect the excess solids.

It is often desirable to combine both the baffles 47 and the opening or slot 46 in a separator, as shown in these figures. I find a mixture of extremely light and extremely heavy particles in the slurry in many types of water. In the operation of the Hughes apparatus for such water, it is preferable to avoid too much of either, so that I endeavor to remove some particles of both types. For such removal I prefer to place two vertical baffles 48 adjacent the sides of the opening and extending from the inner wall 41 to the outer wall of the tank 11 and vertically extending below the bottom 49 of the slot 46. The inclined baffles 47 are located in the tank as heretofore suggested and preferably do not extend below the bottom of the two vertical baffles 48. In this manner the heavier particles in the slurry entering into the separator through the opening 46 will be separated in the section defined by the vertical baffles 48, and the lighter solids will be deposited on the sloping baffles 47 thereby removing both types of solids from the process.

The type of solids separator shown in Figures 1, 2 and 3 may be modified by extending the walls 40, 41, and 42 upwardly through the slurry interface 94 and into the clarified water zone 96, as shown in Figures 6 and 8. In such a type of apparatus the inlet 46 ordinarily should not extend to the top of the chamber.

A second embodiment of my invention is shown in Figures 4, 5 and 6. In this embodiment the separator, or solids regulator, or solids collector, 50, is defined by the wall of tank 11 and a partition structure formed by the walls 51, 52 and 53 which are extended upwardly above the slurry interface 94 and intermediate that surface and the overflow 14. I have found that in most installations it is advisable to extend the walls well above the slurry surface and even to a point not far below the overflow 14. In this embodiment I use no opening or slot such as 46 in Figures 1, 2 and 3. The separator 50 is further defined by sloping bottoms 54, 55 and 56, to form a pocket in the lower portion of the chamber 50. The lower part of the pocket is provided with a solids outlet 57 equipped with a suitable valve 58, so that the concentrated solids can be withdrawn from time to time.

As shown in Figures 4, 5 and 6 I connect the mixing chamber 16 with the separator 50, by means of a pipe or conduit 59, the upper end of which may rest upon the upper rim 17 of the mixing chamber 16. As shown in Figure 6 I prefer that this conduit 59 slope downwardly from the upper rim 17 of the mixing chamber to a point well down in the front wall of the separator, sometimes even below the slurry interface, 94. I place an adjustable valve means, such as a butterfly valve 60, adjusted by any suitable means, such as rod 61, in the upper end of the conduit. Preferably the valve 60 is located close to the upper end of conduit 59, so that when open it will extend into the mixing chamber 16 in order to divert slurry into the regulator. The valve 60 can be opened or closed as desired in order to regulate the amount of liquid passing into the separator 50. By opening the valve 60 outwardly into the mixing chamber it will divert a much greater amount of slurry through the conduit and into the solids collector. Other than the open top 62 of the separator and the opening for slurry inflow conduit 59, I prefer that the walls be closed to the water in the tank 11, so that slurry can enter only through conduit 59. In this embodiment I prefer to place a vertical baffle in the separator 50 in front of the inlet opening 63 to prevent a short-circuiting upward flow of slurry. One embodiment is to extend the vertical baffle 64 from even with or below the lower portion of the slurry inlet opening 63, as at 65, upwardly as the upper front wall of the separator 50 above the level of the inlet 63. In this embodiment a horizontal plate 66 closes the opening between the two front walls 63 and 64. In this modification of the invention I prefer to place baffles 67 above the entrance 63 of the conduit 59 into the separator 50. I have found that by the means disclosed, the solids of the slurry entering the separator will become completely separated. Not only do the heavier solids sink to the bottom of the separator, but the lighter particles as well are removed by the baffles, upon which they collect, and eventually slide down into the bottom of the pocket in a concentrated condition. The water content of the slurry will therefore pass out of the open top 62 of the chamber completely clarified.

A third embodiment of my invention is shown in Figures 7 and 8. It will be apparent that the difference between this embodiment and that shown in Figures 4, 5 and 6 resides primarily in a change of location of the separator 68. In this embodiment I place the solids collector 68 against the wall of the outer circulating cylinder 24. In this modification the separator 68 is formed by the wall of cylinder 24 and by a partition structure which is formed by the plates 69, 70 and 71 extending outwardly into the tank. This device is likewise provided with a sloping bottom 72 so that solids collected therein will readily slip to the bottom, from which they may be withdrawn through pipe 73 provided with a valve 74 outside of tank 11. In this embodiment of my invention I likewise prefer that the walls of the separator extend well above the slurry interface 94, and relatively close to the level of the overflow 14. The common wall between the separator 68 and the outer cylinder 24 is provided with an opening or inlet such as 75 whereby the slurry and particularly the heavier particles can pass readily from the outer chamber 24 into the separator 68. In order to regulate the amount of slurry passing into the separator it is necessary that this inlet 75 be provided with a suitable valve means, such as slide valve 76 operated by means of cord 77. I also prefer to place a plurality of sloping baffles 78 within the separator and at least partially above the inlet 75 from the slurry circulation cylinder. This embodiment is similar to that shown in Figures 4, 5 and 6 in that there are no openings in the walls other than slurry influent 75, so slurry enters the separator only through the one means, and clarified water can pass therefrom into the clarified water zone 96 at the open top 79 of the chamber. In this embodiment, as in that shown in Figures 4, 5 and 6, I have found that the liquid and solids rising in the chamber will become separated, and the liquid will pass over the top 79 completely clarified while the solids collect in the bottom of the pocket and can readily be removed from the apparatus. It is for this reason that I prefer that the walls of the separator 68 extend well above the slurry surface or interface 94.

Figures 9 and 10 disclose a further modification of my invention. The separator 80 may be located, as shown in the drawings, adjacent the outer wall of the tank 11 although it might well be located adjacent the wall of the cylinder 24. As shown, the separator is defined by the outer wall of the tank and by a partition structure comprising walls 81, 82 and 83, and, as in the other modifications, is provided with a sloping bottom 84. In this embodiment the separator is provided with an inlet duct 85 extending from the lower portion of the slurry zone in the bottom of the tank 11 upwardly through and above the sloping floor 84. This duct, as shown, may extend through and beneath the hood 22 or may be located outside of the walls of the hood, depending on the condition and quality of the slurry to be treated or the size and shape of the apparatus. At the lower end of the slurry inlet 85 I place a small impeller 86, attached to the rotor of electric motor 87 by means of a long shaft 88. The shaft 88 should rotate in suitable bearings, such as 89. The impeller is set to force liquid upwardly through the conduit 85. In this embodiment the slurry 95 in the bottom of the tank is drawn upwardly by means of the impeller 86 into an intermediate portion of the separator, so that the heavier particles will sink to the bottom of the chamber while the liquid and lighter slurry will pass upwardly therethrough. It will be understood that when a forced flow of slurry through the separator is used, in many cases it may be impossible to completely separate the solids from the water, so that the water may not be permitted to flow into the clarified water zone 96. In some installations it is possible to place a sufficient number of baffles 91 in the separator to remove all solids from the slurry, and permit clear water to flow into the clear water space 96 in the upper portion of the tank. In such cases the top of the walls of the separator may be below the overflow 14. Generally however I prefer to extend the walls 81, 82 and 83 above the level of the overflow as shown so that liquid may not pass from the separator into the clarified liquid space, 96. In such case I may connect the upper portion of the separator with the outer slurry circulation cylinder 24, preferably at a height approximately that of the top of the mixing cylinder, 16, by any means, such as a conduit, 90. In this event the lighter slurry may pass back into the outer cylinder and be recirculated through the system.

In the modification shown in Figures 9 and 10, as in those previously described, the lower portion of the chamber is provided with a solids withdrawal line 92 equipped with a suitable valve 93.

It will be obvious that the size and number of the separators in the various embodiments of my invention will depend upon the condition and quality of the liquid to be treated.

Manifestly many modifications and variations of the invention hereinbefore set forth may be made by persons skilled in the art without departing from the spirit and scope hereof.

I claim:

1. In an apparatus for removing solid substances from a liquid which comprises a tank, an annular partition structure mounted in said tank and dividing the same into an inner space and an outer space, a constantly open passageway between said spaces adjacent the bottom of the tank, a second constantly open passageway between said spaces at a level spaced above said first passageway, the inner space, said passageways, and the lower portion of the outer space below the level of said second passageway forming a mixing and reaction zone, and the upper portion of the outer space above the level of said second passageway forming a clarified liquid zone, inlet means for delivering liquid to be treated and a treating reagent into said inner space, an impeller within the inner space for mixing the liquid to be treated, reagent, and a suspension containing solids separated from previously treated liquid and accumulated in water undergoing treatment to form a slurry, and for maintaining a circulation of liquid through said mixing and reaction zone, and a treated liquid outlet from the upper portion of said outer space, the combination of a partition means in said outer space forming an open top solids separating chamber of a cross-sectional area substantially less than the cross-sectional area of said outer space, an inlet into said chamber below said open top communicating with the said mixing and reaction zone, and a solids outlet from the lower portion of said chamber.

2. An apparatus according to claim 1 in which the chamber is provided with a plurality of laterally spaced inclined plates extending across the cross-sectional area of said solids separating chamber.

3. An apparatus according to claim 1 comprising also a flow regulating means in said inlet into said chamber.

4. An apparatus according to claim 1 comprising also a flow causing member associated with said inlet into said solids separating chamber for causing an enforced flow of liquid through said inlet into said chamber.

5. In combination with an apparatus for removing solid substances from liquid comprising a tank, means including a centrally disposed annular partition structure mounted in said tank and dividing the same into an inner space and an outer space, a constantly open passageway between the inner space and the outer space adjacent the bottom of said tank, a second constantly open passageway between said spaces at a level spaced above said first passageway, inlet means for delivering liquid to be treated and a treating reagent into the inner space, an agitator in the inner space for mixing the liquid to be treated, reagent, and a suspension containing solids separated from previously treated liquid and accumulated in liquid undergoing treatment to form a slurry, and an outlet for treated liquid from the upper part of said outer space; a second partition structure in said outer space forming a solids separating chamber in the outer space, an inlet from said outer space into the upper portion of said chamber, an outlet from the lower portion of said chamber discharging outside of said tank, and a plurality of laterally spaced inclined plates extending horizontally across the cross-sectional area of the separating chamber and so positioned as to discharge solids settling thereon to the lower portion of said chamber.

6. In combination with a water treating apparatus of the type wherein water is treated in and with a suspension containing solids separated from previously treated water and accumulated in water undergoing treatment to form a slurry, said apparatus comprising a tank having a bottom and side wall, a vertically extending wall structure mounted within said tank and positioned to divide the tank into two laterally adjacent spaces, a constantly open passageway between said spaces adjacent the bottom of said tank, a second constantly open passageway between said spaces at a level spaced above said first passageway, inlet means for water to be treated and a treating reagent discharging into one of said spaces, an agitator in said last mentioned space, a clarified water outlet leading from the upper part of said other space and a drain outlet leading from the bottom of said tank; a partition structure mounted on a wall in said tank and forming an open topped solids thickening chamber in said other space, a waste outlet leading from the bottom of said chamber, a plurality of laterally spaced inclined plates extending across the cross-sectional area of said thickening chamber and forming a plurality of laterally spaced inclined separated flow spaces therebetween, said flow spaces being open at top and bottom, and a slurry inlet into said chamber adjacent to said plates.

7. In combination with an apparatus for removing solid substances from liquid comprising a tank, an annular partition means vertically mounted in said tank and dividing said tank into an inner space and an outer space, a constantly open passageway between the inner space and the outer space adjacent the lower end of said partition, a second constantly open passageway between said inner space and said outer space spaced above said first passageway, inlet means for liquid to be treated and a treating reagent discharging into said inner space, an agitator within said inner space for mixing the liquid to be treated, reagent, and a suspension containing solids separated from previously treated liquid and accumulated in liquid undergoing treatment to form a slurry, and an outlet for treated liquid from said outer space: a solids separating chamber in said outer space extending to an elevation above said second passageway, a passageway from said inner space into an intermediate level of said solids separating chamber, an outlet from the lower portion of said chamber discharging outside of said tank, and an outlet from the upper portion of said chamber discharging into said outer space.

8. In combination in a liquid treating apparatus of the type wherein liquid is treated in and mixed with a slurry containing solids separated from previously treated liquid, a tank, a partition structure within the tank so constructed and arranged as to divide the tank into two laterally adjacent spaces, an outlet from the upper part of one of said spaces, an agitator in said other space, an inlet for liquid to be treated opening into said other space and a reagent conduit opening into said other space, a passageway between said spaces adjacent the bottom of said tank, and a second passageway between said spaces at a level above said first passageway: a second partition structure mounted in said first mentioned space and forming an open top solids separating chamber, a passageway from said other space into the interior of said solids separating chamber and discharging therein below the open top thereof, and a waste outlet from adjacent the bottom of said chamber and discharging outside the tank.

9. An apparatus according to claim 8 comprising also a plurality of laterally spaced sloping plates extending across said solids separating chamber and forming laterally spaced inclined flow spaces therebetween.

10. In combination with a liquid treating apparatus of the type wherein the water is treated in and finally separated from a suspension containing solids separated from previously treated water and accumulated in water undergoing treatment to form a slurry, said apparatus comprising a tank, means for maintaining a circulation of slurry in a portion only of said tank, inlet means for liquid to be treated and a chemical reagent, and an outlet for treated liquid: means for controlling the amount of solids in the slurry comprising a solids separating chamber within the apparatus, said chamber having a primary slurry inlet in the form of an unobstructedly open top positioned below the slurry level within the apparatus, a secondary slurry inlet in a wall of said chamber below said open top, an outlet from said chamber adapted to discharge solids from the apparatus, and a plurality of sloping plates associated with, and so positioned as to discharge solids settling thereon to the interior of, said chamber.

11. In combination with a water treating apparatus of the type wherein the water is treated with and finally separated from a suspension comprising water and solids separated from previously treated water and accumulated to form a slurry, said apparatus including a tank, and means for maintaining a circulation of slurry in a portion of said tank: a solids separating chamber within said tank having a cross-sectional area substantially less than the cross-sectional area of the tank, said chamber being provided with an opening at the top thereof and so located as to afford communication with the slurry, an outlet to waste from adjacent the bottom of said chamber, and a plurality of relatively small sloping plates associated with, and so positioned as to discharge the solids settling thereon to the interior of, said chamber.

12. In combination with a water treating apparatus of the type wherein water is treated in and with a slurry and clarified water issues from, and is withdrawn from above, the upper slurry surface, said apparatus comprising a tank, an annular partition structure vertically mounted in said tank and forming therein an inner space and an outer space, a constantly open passageway between said inner and outer spaces adjacent the bottom of said tank, a second constantly open passageway between said spaces at a level spaced above said first passageway, inlet means for water to be treated and a treating reagent leading into said inner space, an agitator in said inner space and a clarified water outlet leading from the upper portion of said outer space: improved means for opposing a rise of the upper slurry surface beyond a predetermined level comprising an open top solids separating chamber in said outer space and below the level of said second passageway, an outlet to waste leading from the lower portion of said chamber, and a plurality of laterally spaced inclined plates mounted across said chamber and extending upwardly to an elevation above the level of said second passageway.

WALTER H. GREEN.

REFERENCES CITED

The following references are of record in the file of this patent:

UNITED STATES PATENTS

| Number | Name | Date |
|---|---|---|
| 1,864,866 | Snow | June 28, 1932 |
| 2,245,588 | Hughes | June 17, 1941 |
| 653,010 | Koyl | July 3, 1900 |
| 2,128,569 | Velz | Aug. 30, 1938 |
| 349,990 | Gaillet et al. | Sept. 28, 1886 |
| 2,021,672 | Spaulding | Nov. 19, 1935 |
| 1,957,898 | Mitchell | May 8, 1934 |
| 2,179,246 | Applebaum | Nov. 7, 1939 |
| 2,245,583 | Green | June 17, 1941 |
| 1,009,857 | Reisert | Nov. 28, 1911 |
| 1,458,805 | Christensen | June 12, 1923 |
| 1,633,195 | Schwab et al. | June 21, 1927 |
| 1,585,979 | Harrison | May 25, 1926 |

FOREIGN PATENTS

| Number | Country | Date |
|---|---|---|
| 238,007 | Great Britain | Aug. 10, 1925 |